United States Patent [19]

Dietrick et al.

[11] Patent Number: 5,180,488

[45] Date of Patent: Jan. 19, 1993

[54] FILTER SCREEN ASSEMBLY AND METHOD OF FILTERING CONSTITUENTS FROM FLUID MIXTURES

[75] Inventors: Gerald P. Dietrick; Michael J. Vagedes, both of Walton, Ky.

[73] Assignee: Venture Production Company, Walton, Ky.

[21] Appl. No.: 654,728

[22] Filed: Feb. 13, 1991

Related U.S. Application Data

[63] Continuation-in-part of Ser. No. 354,487, May 19, 1989, Pat. No. 5,000,846.

[51] Int. Cl.$^5$ .............................................. B01D 29/41
[52] U.S. Cl. .................................. 210/232; 210/323.1; 210/346; 210/487
[58] Field of Search ...................... 210/232, 323.1, 346, 210/347, 487, 486, 461, 462, 498

[56] References Cited

U.S. PATENT DOCUMENTS

| | | | |
|---|---|---|---|
| 2,443,087 | 6/1948 | Ulrich | 210/461 |
| 2,821,305 | 1/1958 | Anderson | 210/461 |
| 3,659,718 | 5/1972 | Braciner et al. | 210/323.1 |
| 4,307,503 | 12/1981 | Auld et al. | 210/486 |
| 4,608,164 | 8/1986 | Neu | 210/232 |
| 4,776,164 | 10/1988 | Stephenson | 210/461 |
| 4,789,474 | 12/1988 | Gaudfir | 210/346 |

Primary Examiner—Robert A. Dawson
Assistant Examiner—W. L. Millard
Attorney, Agent, or Firm—Wood, Herron & Evans

[57] ABSTRACT

A filter screen assembly for removing particulate material from a slurry in a vessel. Mass producible slotted faced plates are assembled in pairs to enclose a chamber means between two slotted faces, an apertured edge and three closed edges mounted on a collector tube with the chamber in communication with the bore of the tube through said apertured edge, one end of the tube being closed and the other end being in communication with an intake port of a pump and said chambers. A filter media envelopes assembled pairs of slotted faced plates and the portion of the collector tube they are mounted on, while the other portion of the collector tube projects from an opening in said envelope and is sealingly engaged by a collar portion of the media secured against the collector tube. Reduced pressure impressed on the interior of the collector tube causes a slurry of liquid and particulate no greater than a predetermined size to be drawn through the media and slots in the plates. The media is oriented so particulate greater than predetermined size in the slurry exteriorly of the media is not retained against the exterior surface of the media, but settles to form a concentrated sludge in and withdrawable from the tank bottom through a bottom drain. A plurality of assemblies with spaced parallel upright media may be mounted on a manifold to provide large filter area in a small volume.

20 Claims, 8 Drawing Sheets

FILTER SCREEN ASSEMBLY AND METHOD OF FILTERING CONSTITUENTS FROM FLUID MIXTURES

This application is a continuation-in-part of our co-pending application Ser. No. 07/354,487, filed May 19, 1989, which is now U.S. Pat. No. 5,000,846.

BACKGROUND OF THE INVENTION

Filter units are widely used for separating particulate material from a slurry in which it is contained. For example, manufacturing process fluids such as "cutting-coolant-fluid" used in metal machining operations, such as in an automotive engine manufacturing plant, are usually circulated in a system serving a number of manufacturing machines. In such systems a filter device removes undesired particulate, viz., metal particles or the like, which enter the fluid as it moves through its normal path in the manufacturing process between passes through the filter device. The continuous recirculation of the coolant draws air from the environment into the coolant where the trapped air becomes saturated with moisture and then escapes to the plant atmosphere, while contaminants in the air, such as lint, pollen, micro organisms and dust are deposited and trapped in the coolant. In addition, lubricating oils from the machinery and spent oils from the manufacturing process are continually absorbed and trapped in the coolant as well.

The filter capacity must be suitable to meet the needs of the machining operation involved. The filter device is usually selected on the basis of the volume of cutting-coolant needed and the competitive prices of devices considered for use compared to the planned expenditure. Current technology uses either high flow rate permanent filter media, or high flow rate disposable filter media, or a combination of both. Regardless of which method is used, the particles which do not pass through the filter media collect on top of the media as an increasingly thicker "filter cake", which in turn removes progressively smaller particles which would have continued to pass through but for the build-up of filter cake. As the filter cake builds, it becomes progressively tighter with the result that the flow through the system becomes progressively choked by continued accumulation of fine particles in the filter cake to the point where the flow is restricted to a point of capacity failure. At such point, the filter cake must be removed and the filter restarted. Following restarting of the filter, the continuous accumulation of dirt particles in the slurry as filter cake building continues, results in the build-up of residual fines and chemical compounds in the cutting-coolant-fluid adversely effecting the quality of the fluid. When the quality of the coolant reaches sub-acceptable levels, the coolant is dumped from the system and the system is then cleaned and recharged with the result that the dumping and cleaning operations become a major cause for increase in the size of waste treatment plants utilized in the respective manufacturing plants of which they are a part.

As civilization progresses, the need for pure water and recycling becomes more and more intense. Current technology uses settling systems which consist of farms of huge settling tanks, some of which are indoors, requiring capital expenditures which can only be written off over periods of many years. To enhance the operation of settling systems, chemical additives are used, and, their use in turn increases the bulk of the waste discharge and adds to the pollution load. With increasing bulk discharge, sophisticated de-watering devices are used to then decrease the bulk of the waste and allow it to be used as landfill.

Sophisticated manufacturing processes demand more and more pure water to accomplish their goals. We can no longer use the classic solution of dilution to solve the pollution problem. We must deal with pollution at the source, which means that recycling is not only the practical solution to the pollution problem, it is the only solution for the survival of our planet. The key to the eventual control of water and air pollution in combination with modern membrane technology demands a complete rethinking of the methods used to remove particulate matter from air and water.

Recycling of coolants was first recognized in the manufacturing industry in the early 1940's. In a metal machining operation such as mentioned above, a "cutting-coolant-fluid" requirement could be of the order of 5000 gallons per minute.

Filter devices using filter cake formed of either the dirt to be removed or artificial filter aids, viz., diatomaceous earth, to produce a filter cake, still represents the state of the art accepted by industry. The result is inefficiency, pollution and waste. Regardless of the method used, the flow rate through the filter area is the critical factor. Modern filter devices use flow rates of five and ten gallons per minute per square foot of filter area, and in roughing operations, even thirty gallons per minute per square foot. These flow parameters are justified because the cost of filter area for an operating system is of the order of $1,000.00/sq. ft. of filter area for a system requiring as much as 100 sq. ft. of filter area, while smaller systems can be even $2,000.00/sq. ft. In addition, even if the cost could be justified to double the filter area, using modern technology the floor space required for the equipment would be impractical.

An object of this invention is to provide a filter device that (1) economically allows the use of amounts of filter area that are massive in comparison to current practices described above and at the same time permits the use in a compact space, (2) provides the amount of filter area necessary for a low rate to avoid filter cake buildup, (3) provides the amount of filter area necessary for a flow rate that does not mechanically hold contaminants to the filter area against gravity forces, (4) provides the amount of filter area necessary to allow osmosis-like flow through substantially permanent membranes using low pressure and negligible fluid velocity, (5) may be continuously operated, (6) provides a substantially permanent filter media or membrane, (7) has a throughput at substantially constant volume, (8) may have a filter membrane which maintains constant particle size discrimination so particulate of acceptable and smaller sizes passes through the membrane, and (9) in which the particulate material which does not pass through the membrane tends to fall out of the slurry to concentrate such particulate in a location from which it may be removed from the filter device while the filter device remains in operation.

A further object of this invention is to provide a filter device in which filter areas are arranged in a vertical attitude and immersed in a slurry in a slurry holding vessel.

A further object of this invention is to provide in such a filter device massive amounts of substantially permanent filter area that is integrated into the slurry holding vessel so as to divide the slurry holding vessel to hold unfiltered slurry on one side of the filter area and clean, filtered slurry on the opposite side of the filter area in the same holding vessel.

A further object of this invention is to provide a filter device that uses a substantially permanent membrane to attain the degree of constant discrimination filtration desired at a constant flow without the necessity of building a filter cake.

A further object of this invention is to provide a filter device of the above mentioned character in which particles with a density greater than the density of the slurry fluid can agglomerate and settle to the bottom of the vessel for removal.

A further object of this invention is to provide a filter device of the above mentioned character in which floatable particles and oils of the slurry are not held against the filter surface, but rather rise to the top of the slurry in the vessel for removal by skimming.

Another object of this invention is to provide for such a filter screen assembly, a filter screen unit which is of simple construction, die moldable, durable, strong, inexpensive, easy to assemble, clean and replace, and which resists degradation under the conditions and substances present in the environment it is subjected to in the operation of the filter screen.

Another object of this invention is to provide a slurry filter screen unit having oppositely faced parallel filter faces, each having spacing support means projecting toward the other so that inward forces applied to one filter face are mechanically transferred to the opposite face to substantially offset forces directed inwardly against the latter.

Another object of this invention is to provide such a filter screen unit with a filter media web overlying the filter faces and adapted to filter from the slurry passing through the media all particles larger than a predetermined size which would otherwise pass through the filter faces of the unit.

A further object of this invention is to provide a filter screen assembly having filter media of bag-like form overlying the filter faces of the unit.

A further object of this invention is to provide a filter chip substantially enveloped by media screen assembly having substantial area and the capability of discrete selection of particle size to be passed through while having a relatively small sealing surface cooperating with a portion of the chip extending outward from the enveloping media.

BRIEF STATEMENT OF THE INVENTION

Briefly, this invention provides the opportunity to depart from the high flow rate low area art of filtration by economically providing massive amounts of substantially permanent filter area as an alternative to using disposable filter media with its economic, maintenance and pollution problems. This invention also provides the opportunity to depart from the use of huge settling tanks and the use of chemicals and filter aids with their economic, maintenance and pollution problems. In addition, this invention provides the opportunity to depart from the use of high pressures and high velocities to accomplish ion filtration with its economic, maintenance and pollution problems. This invention will provide clean water and clean air at affordable cost without multiplying the effects of the pollution problem.

This invention provides a filter assembly which includes a plurality of filter chips built up from a single mass produced slotted filter element paired to form filter units. The chips include pairs of slotted elements assembled in an overlying relation to form filter units with a space therebetween into which liquid from a slurry may be drawn. Pipe means is connected to the space. Reduced pressure impressing means connected to the pipe means provides reduced pressure to the space between the elements. The pairs of elements are mounted on pipes and a plurality of pairs of elements can be mounted to a single pipe or multiple pipes connected together.

This invention provides a filter chip having a jacket of substantially permanent media or membrane, having a turtleneck at one end and an open opposite end which can be drawn over the pipe means and pairs of elements mounted thereon so the turtleneck thereof encircles the pipe means adjacent the pairs of elements and the open opposite end extends beyond the pairs of elements remote from the turtleneck portion thereof. The turtleneck portion can be clamped in substantially sealed relation against the exterior surface of the pipe and the opposite end of the jacket is sealed closed so that liquid drawn from the slurry through the slots must first pass through the filter media jacket.

This invention further provides filter means with vertically oriented filter area, low flow rate, and means for impressing a reduced pressure across the chips. The liquid of the slurry with entrained particles no larger than predetermined size passes through the surface area of the chips allowing the larger particulate in the unfiltered slurry to agglomerate and settle out of the unfiltered slurry without being held or attached to the filter surface of the chips.

The above and other objects and features of the invention will be apparent to those skilled in the art from the following detailed description and the drawings.

DESCRIPTION OF PRESENTLY PREFERRED EMBODIMENT

Figure 2:
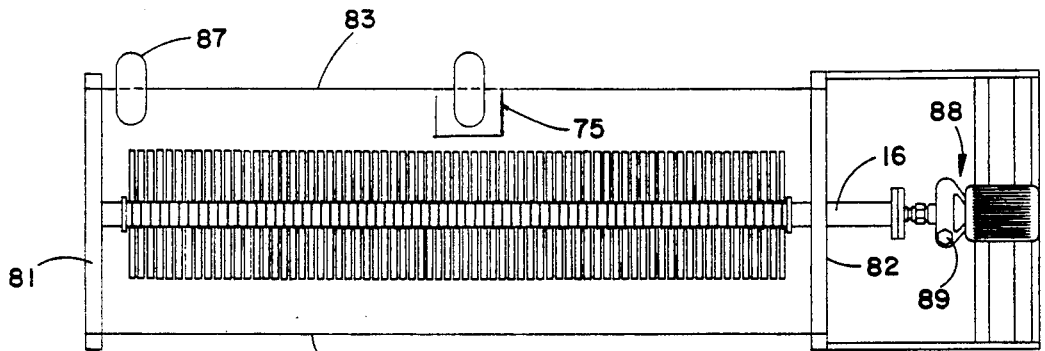
FIG. 2 is a top plan view of the device shown in FIG. 1.

In the following detailed description and the drawings, like reference characters indicate like parts.

Figure 8:
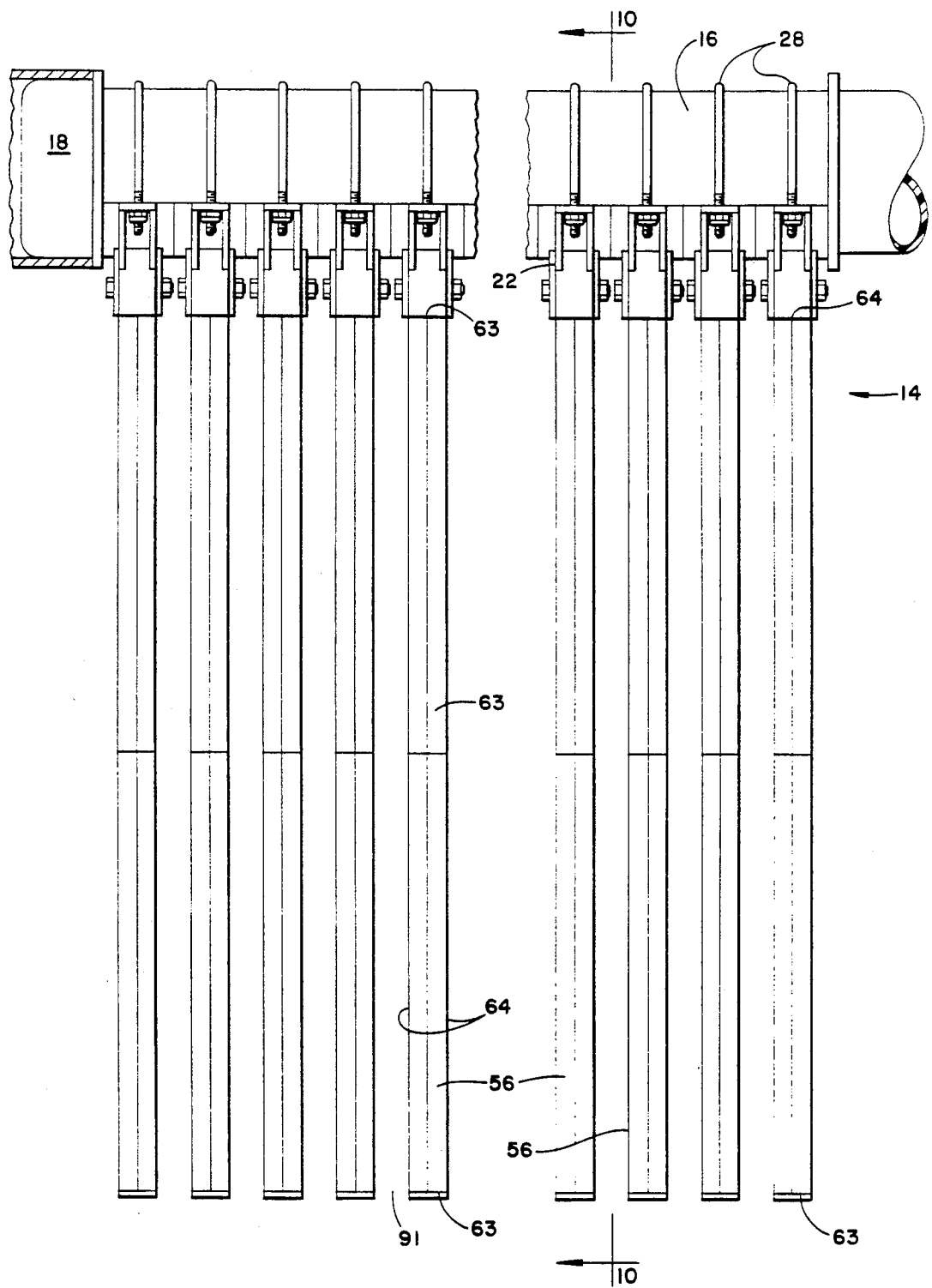
FIG. 8 is a somewhat schematic view in side elevation of a fragmentary portion of the filter screen assembly constructed in accordance with an embodiment of this invention.
Figure 9:
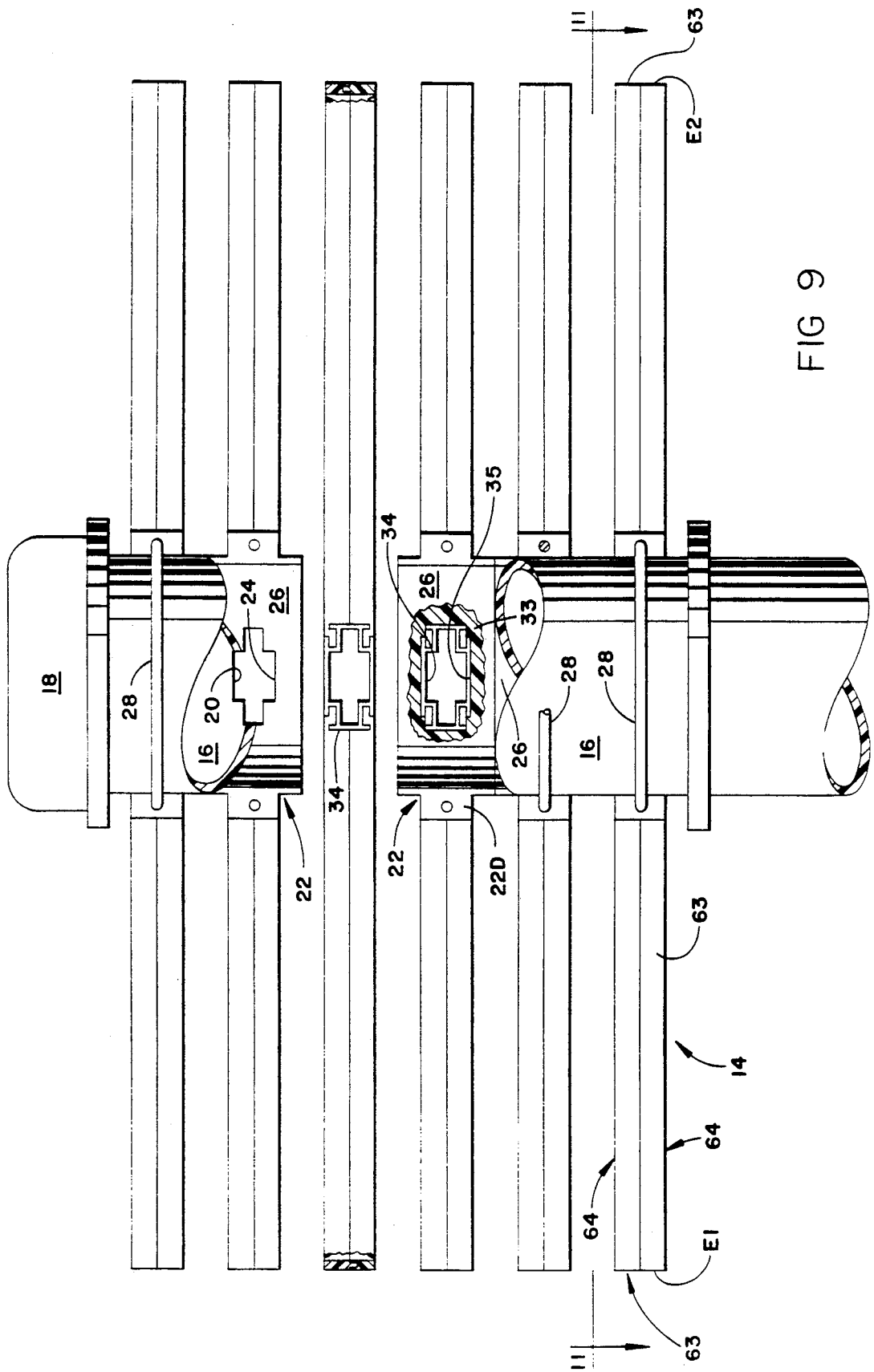
FIG. 9 is a fragmentary plan view of the filter screen assembly looking in the direction of arrows 9—9 in FIG. 10.
Figure 10:
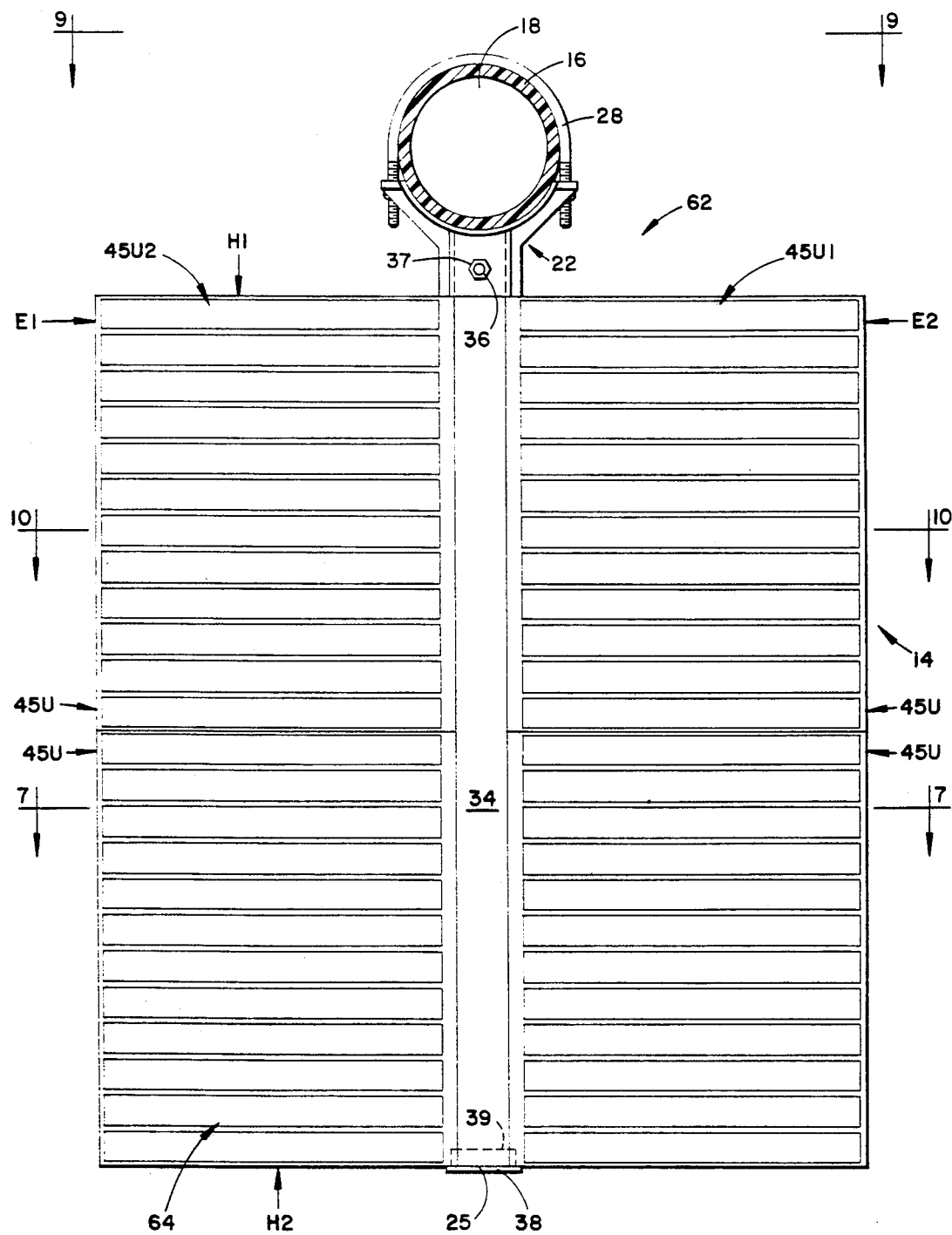
FIG. 10 is a somewhat schematic view in end elevation of the filter chip assembly looking in the direction of the arrows 10—10 in FIG. 8, four slotted plates of the assembly being shown.

In FIGS. 8, 9 and 10 is shown a filter screen assembly 14 which includes main pipe 16. The main pipe is closed at one end by a cap 18. The main pipe 16 is provided with a series of elongated openings 20 shown in FIGS. 9 and 11. Saddle members 22 are mounted on main pipe 16 underlying the openings 20 of the main pipe 16. Elongated openings 24 in the saddle members 22 are aligned with the openings 20 in the main pipe 16. The saddle members 22 are respectively held in assembled relation to main pipe 16 by U-bolts 28. As shown most clearly in FIG. 11, U-bolts 28 straddle main pipe 16 with the threaded end portions 29 of the U-bolts extending through apertures 30 in the saddle arms 31 outboard of the curved surface 26 of saddle members 22 upon which pipe 16 seats. Nuts 32 are threaded on the threads of U-bolt ends 29 and tightened so that main pipe 16 is securely seated in mated relation on the opposing face 26 of saddle 22.

Figure 11:
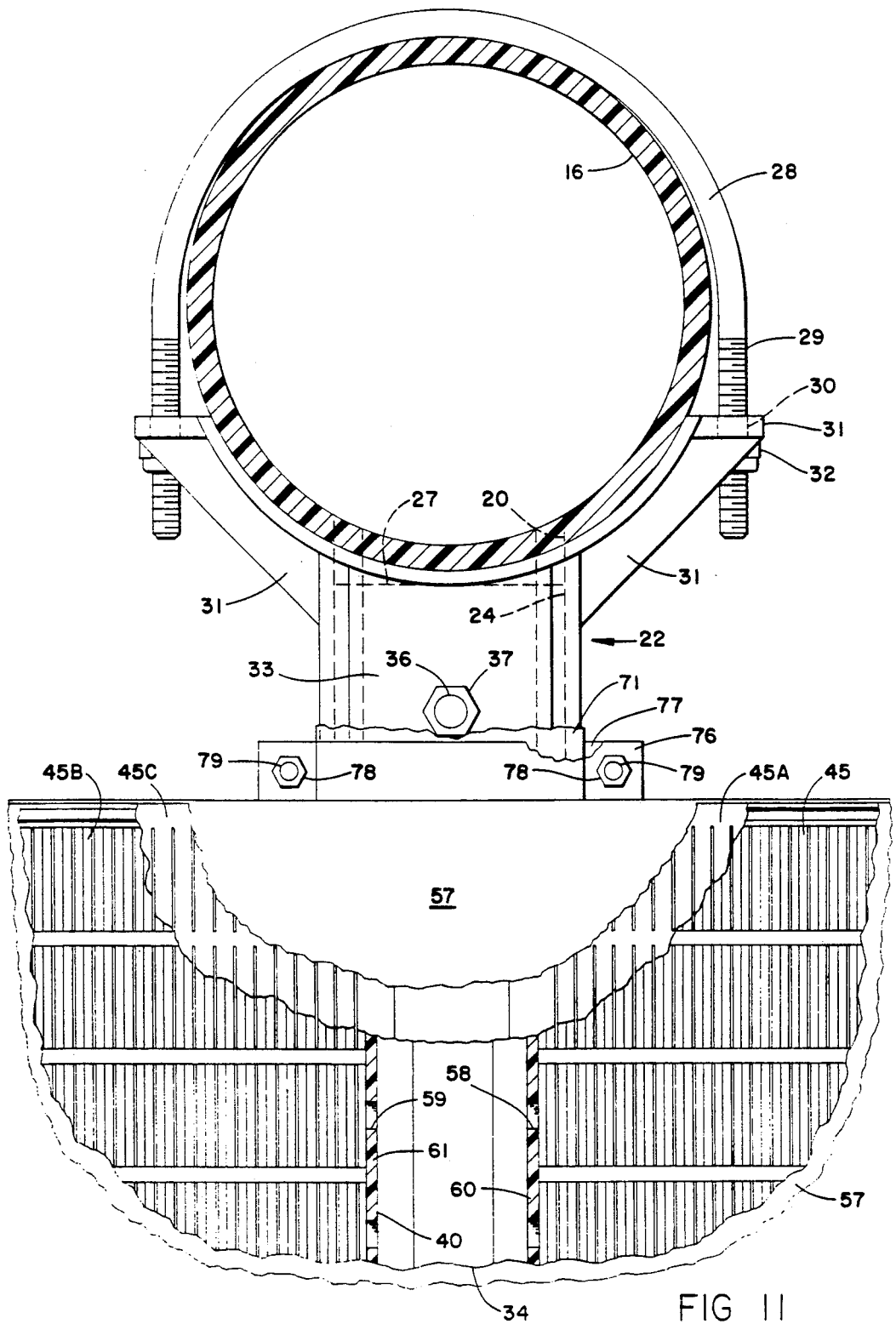
FIG. 11 is a fragmentary view in section taken on the line 11—11 in FIG. 9, portions of the structure being partly broken away for purposes of illustration.

The saddle members 22 as shown in FIG. 11 may be of a somewhat Y-shaped configuration when viewed in a direction parallel to the axis of pipe 16. Saddle arms 31 extend symmetrically upwardly and outwardly from the upright stem portion 33. Stem portion 33 has a hollow downwardly open socket 35 of a somewhat cruciform cross-section, which slidingly receives an upper portion of a collector tube 34. The cross-section configuration of tube 34 is shown in enlarged scale in FIG. 7. In FIG. 9 saddle member 22D is broken away to show a portion of a collector tube 34 received in mating relation in the socket 35 in the stem 33 of the saddle member 22D. The upper end of collector tube 34 is located at elevation 27 indicated by a dashed line in FIG. 11. With the collector tube 34 in the position shown in FIG. 11, an aperture is drilled through the socket portion of stem 33 of the saddle member 22 and through the portion of the collector tube 34 therein and a retaining member, such as bolt 36, is inserted and secured in place as by nut 37 in threaded engagement with the bolt.

Figure 7:
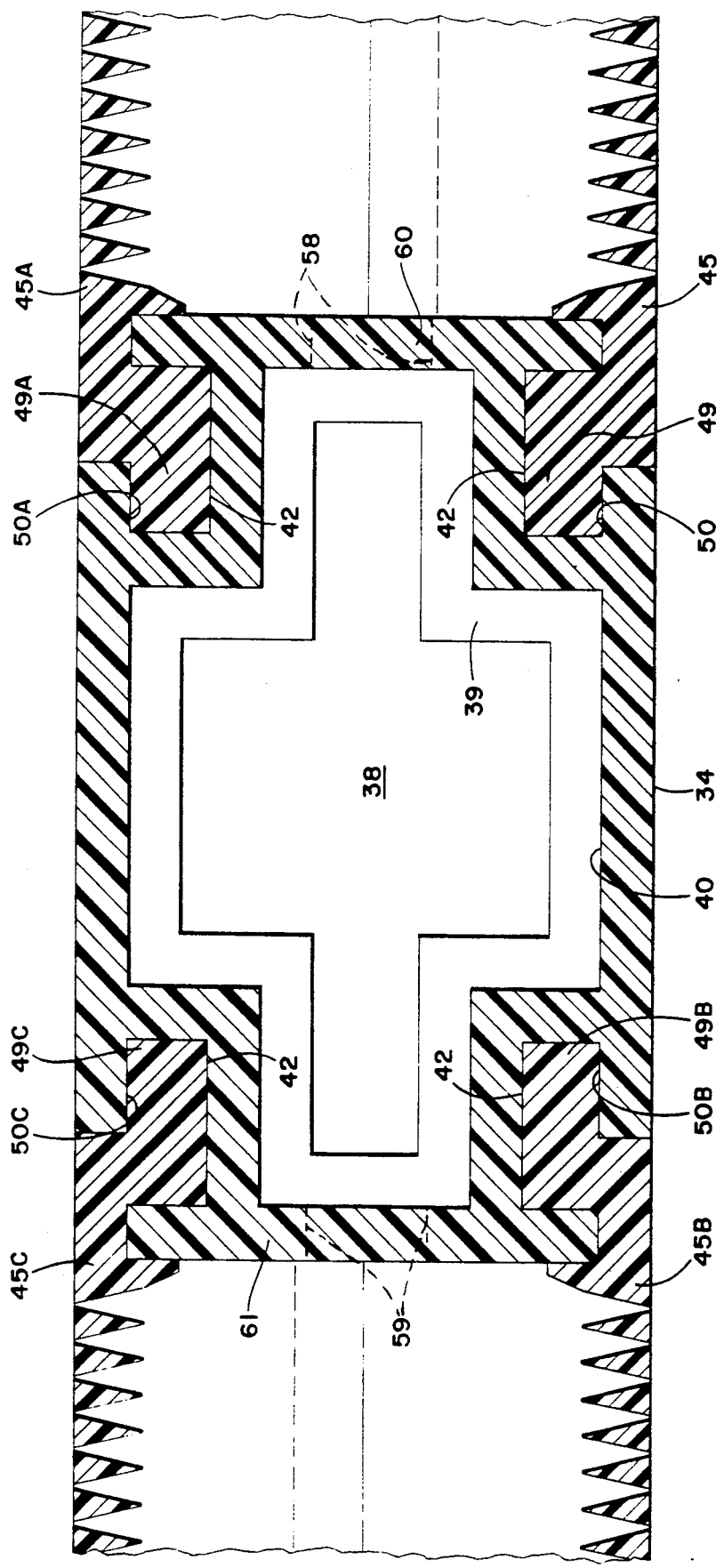
FIG. 7 is a view in section taken on the line 7—7 in FIG. 10.

Collector tube 34 extends downwardly from the saddle member 22 to a remote lower end 25 which is closed by a plug 38 shown in FIGS. 7, 8 and 10. The collector tube may be formed by extrusion and composed of a suitable synthetic resin or other material as may be desired. As shown in FIG. 7, plug 38 has an upstanding annular flange 39 snugly received in the bore 40 and closes the lower end 25 of the collector tube 34. As shown in FIG. 7, collector tube 34 is formed with grooves 50, 50A, 50B, 50C adjacent its outer corners to receive offset hook-shaped flanges 49, 49A, 49B, 49C of slotted plate members 45, 45A, 45B, 45C.

Figure 4:
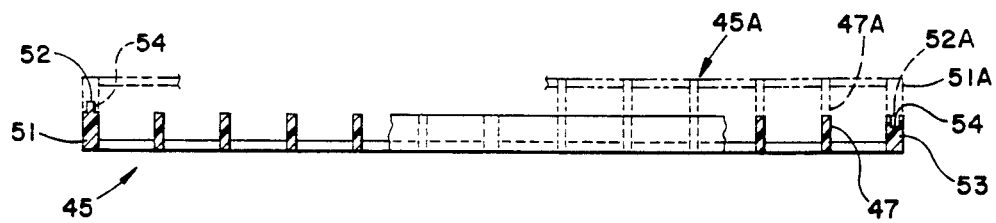
FIG. 4 is a view in section taken generally on the line 4—4 in FIG. 3.
Figure 3:
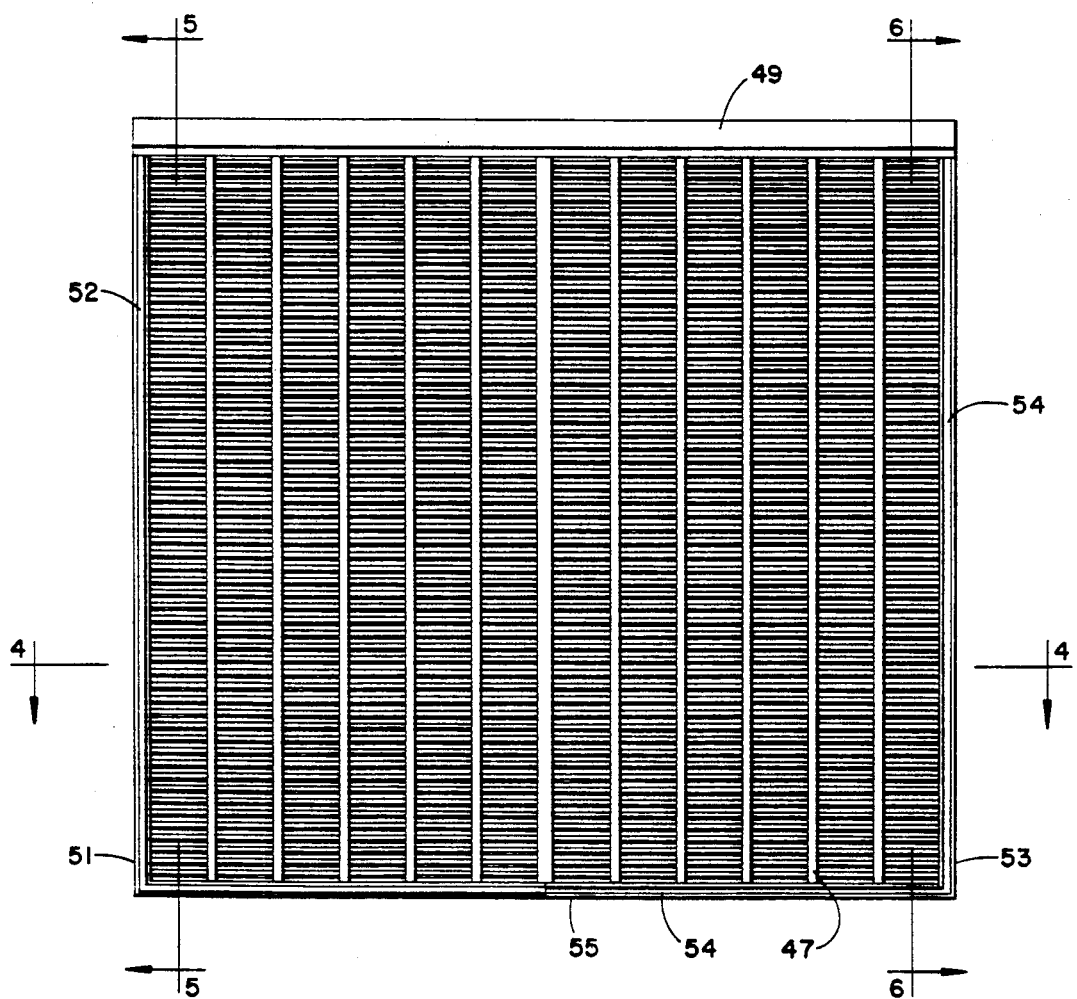
FIG. 3 is a view in side elevation of a plate unit of the filter screen assembly removed therefrom.

Slotted plates 45 can be moldings provided with numerous slots 48 as shown in FIGS. 3, 4, 5, 6, 7 and 11. Adjacent slots 48 are separated by prism-shaped dividers 46 which are triangular in cross-section and by separator bars 47. A pair of the slotted plates 45, 45A may be assembled as shown in FIG. 4. Wall 51 of plate 45 has a tongue 52 while wall 53 has a groove 54. As shown in FIG. 3, wall 55 extends between walls 51 and 53 and tongue 52 continues from wall 51 along wall 55 to its mid point where it meets end-to-end groove 54 which extends along wall 53 and wall 55 to the mid point mentioned. Plates 45 and 45A are duplicates so that when plate 45A is placed in inverted position on plate 45 as shown in FIG. 4, the tongue 52A corresponding to tongue 52 is received in the groove 54 while tongue 52 of plate 45 is received in groove 54A of plate 45A. When so assembled, the separator bars 47 and 47A are in abutment so that inwardly directed forces applied to the slotted face of plate 45 may be transmitted through the separator bars to the slotted face of plate 45A. The plates 45, 45A when so assembled are cemented or otherwise secured to form a unitary slotted faced filter unit 45U having its major opposite faces slotted, three closed edges bounding the space between the slotted faces and along the fourth edge of each of the slotted plates 45, 45A, hook-shaped flanges 49, 49A extend in parallel spaced relation to each other and laterally bound an intermediate slot-like opening 42 in the fourth edge in communication with the interior of the assembly. Hook-shaped flanges 49, 49A of filter unit 45U may be engaged in interlocking relation to a collector tube 34 by sliding endwise into grooves 50, 50A of collector tube 34 and may be inserted either from the end receivable in socket 35 of a saddle member 22 or through the opposite end while it is not obstructed by the plug 38. A similar filter unit 45U1 of a pair of slotted plates 45B and 45C having hook-shaped flanges 49B and 49C is mounted in like manner on the opposite side of collector tube 34 with the flanges 49B, 49C engaged in grooves 50B, 50C. Apertures 58 and 59 are provided in walls 60, 61 of collector tube 34 to provide desired communication between the bore 40 of the collector tube 34 and through opening 42 with the interior of filter units 45U1 and 45U2.

Figure 5:
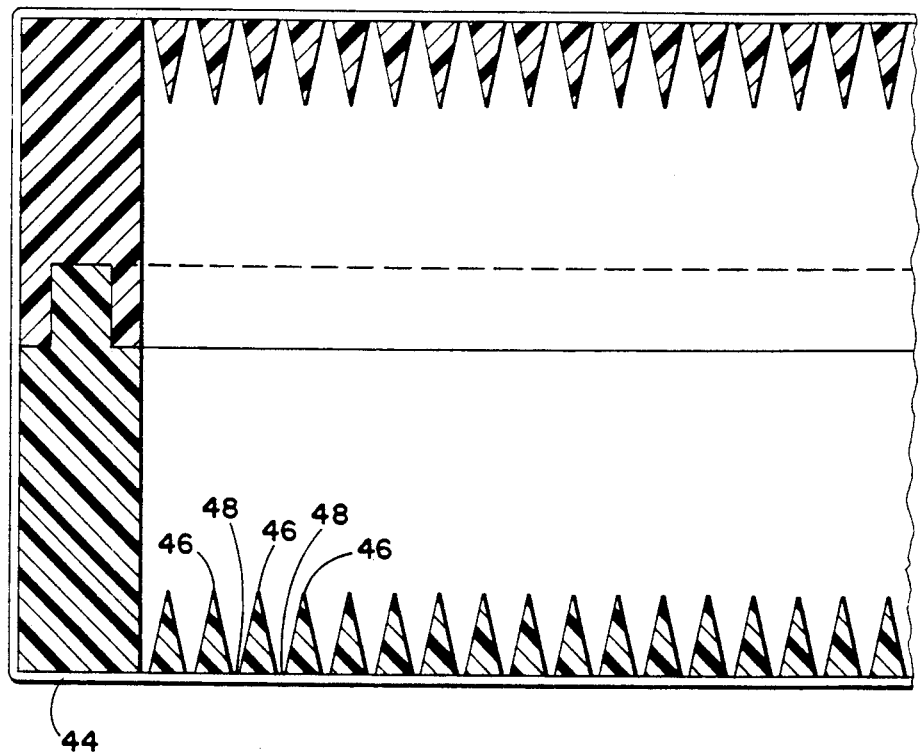
FIG. 5 is a fragmentary view in section taken on the line 5—5 in FIG. 3.
Figure 6:
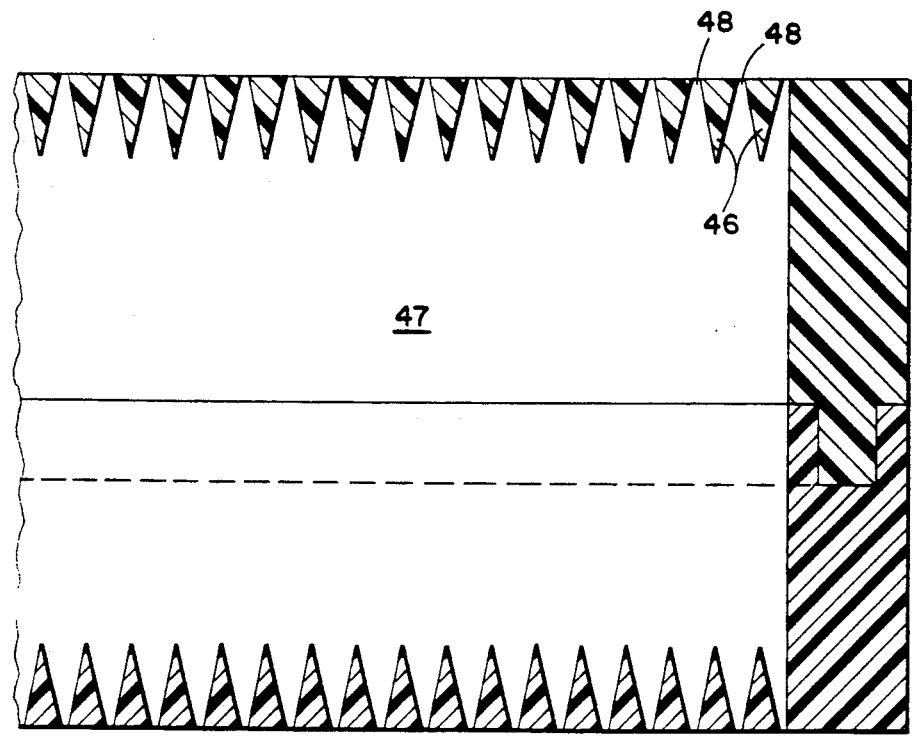
FIG. 6 is a fragmentary view in section taken on the line 6—6 in FIG. 3.

As shown in FIG. 10, a plurality of plate assemblies 45U may be mounted on collector tube 34 between saddle 22 and plug 38. As shown in FIG. 10, four plate assemblies 45U are mounted, two on each side, of collector tube 34 and all in generally coplanar relation to each other to form a filter chip 56 which has, as shown in FIGS. 8 and 9, thin top, side and bottom edges 63 and has broad slotted faces 64. However, the collector tube 34 may be made of greater length so as to accommodate a greater number of opposed pairs of plate assemblies 45U thereby providing a filter chip 56 having a greater filter area served by the particular collector tube 34. Irrespective of the number of pairs of slotted plate assemblies mounted on the collector tube, the length of the latter is such that a plug 38 abuts the edge of the plate assemblies 45U furtherest from the saddle 22 while the lower end of saddle 22 abuts the edge faces of the pair of panel assemblies 45U adjacent thereto.

Where the minimum size of particles desired to be filtered from the slurry is larger than slurry particles which will pass through slots 48 in the slotted plates 45 of filter units 45U, the filter units themselves may be the filter media of the filter screen assembly. However, it is often desired that much smaller size particles be filtered out of slurry liquid, and, in such case as shown in FIG. 5, a filter media web or membrane 44 may be provided in overlying relation to the slurry side of the slotted plates 45 of the filter units 45U. The web of filter media 44 may be adhered to the slotted faces of plates 45 or be in the form of bags or envelopes which preferably snugly fit around the outer surface of a filter unit 45U, or several thereof when assembled as shown in mounted condition in FIG. 10.

Figure 12:
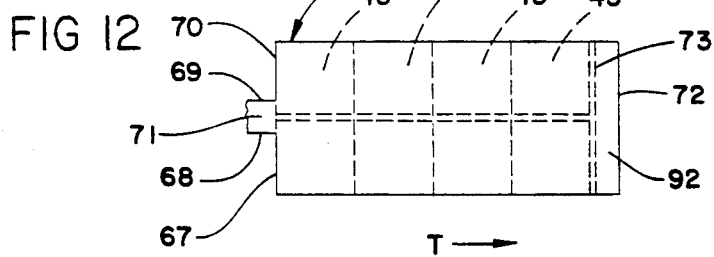
FIG. 12 is a plan view of a tubular filter media for use in making filter chips.

A filter chip frame 62 (a saddle 22, collector tube 34, filter units 45U, bolt 36, nut 37 and plug 38) may be provided with a filter web or membrane by forming a tubular membrane 57 having a girth substantially equal to the girth of the filter chip assembly on a plane such as 10—10 in FIG. 10. As shown in FIG. 12, one end of the tube 57 may be sealed shut on lines 67, 68, 69, 70 to provide a narrowed central opening having an annular turtleneck-like collar portion 71 adapted to snugly receive an upright stem portion 33 containing socket portion 35 (shown in FIG. 9) of a saddle member 22. With the saddle member 22 removed, the portion of the collector tube 34 to be received in socket 35 is inserted first through the open end 72 of the tubular media cover and advanced through the open end of the cover until the lead portion of collector tube 34 is advanced through the opening bounded by collar 71 until the leading edges of filter units 45U rest snugly against the inward face of media 57 adjacent respective seal lines 67 and 70 and into seated relation in socket 35. The collar 71 is secured tightly about upright stem 33 of saddle member 22 by retaining band members 76, 77 when band bolt nuts 78 are appropriately tightened on band bolts 79. As also shown in FIG. 11, the retaining band may engage the portion of the media tube overlying the edge of filter units mounted on collector tube 34 adjacent saddle member 22. Tubular media 57 may then be drawn in the direction of arrow T in FIG. 12 to place the media tube in snug relation to the exterior surface of filter chip 56. The media tube is then sealed-seamed at 73 transversely adjacent the end of filter units of the chip (indicated by dashed lines in FIG. 12) remote from saddle member 22, and the excess 92 of the media tube 57 is cut away to provide a filter chip having a media of desired character which will remove all particles in excess of a predetermined size from the fluid moving through the media into the filter chip.

As shown in FIGS. 8 and 9, saddle members 22 are in side-by-side abutment when mounted on tube 16. The dimension of the seat 26 parallel to the axis of pipe 16 may be selected to provide the desired gap or spacing between adjacent filter chips.

Figure 1:
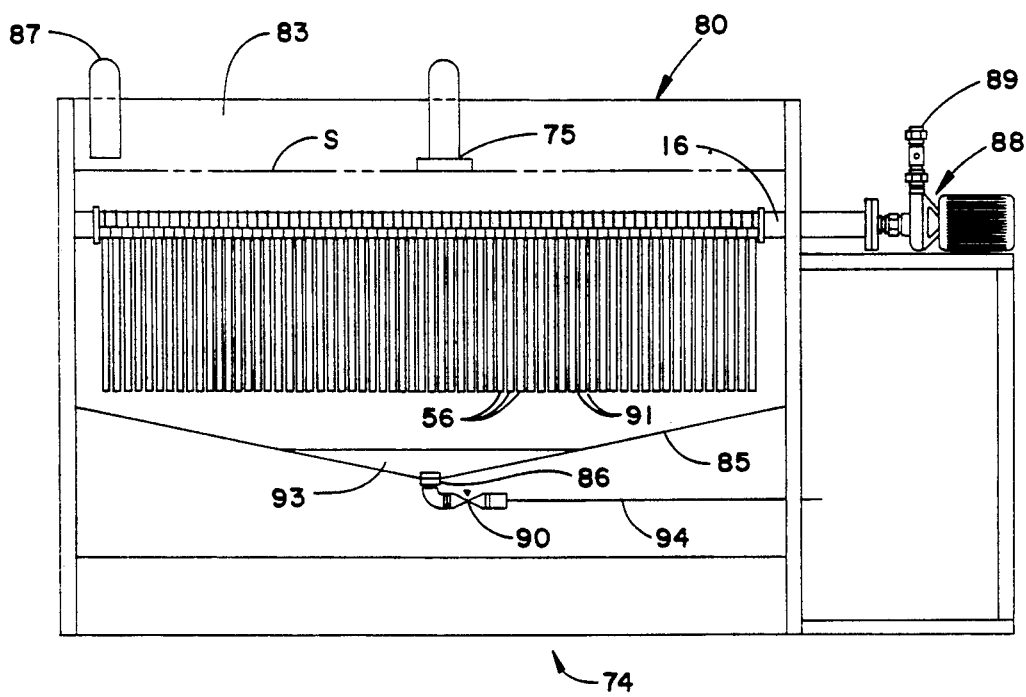
FIG. 1 is a somewhat schematic view in side elevation of a filter device constructed in accordance with an embodiment of this invention.

As shown in FIGS. 1 and 2, tank 80 of filter device 74 has a pipe 16 extending from end 81 to end 82, side walls 83, 84 spaced laterally of pipe 16 and a bottom 85 sloping downwardly to a central lowest point where drain fitting 86 is provided. A slurry feed line 87 delivers slurry to tank 80 and the slurry in the tank is preferably maintained at a level such as S in FIG. 1. A skimmer 75 effects skimming of particles floating on the surface of the slurry. The pressure in pipe 16 and chips 56 is reduced by pump 88 which draws slurry through the filter media of the chips into pipe 16 and discharges it through line 89.

As shown in FIGS. 1, 2 and 8, the filter chips are mounted on pipe 16 with their filter faces extending vertically in parallel spaced relation to each other. The adjacent filter faces 64 of adjacent chips 56 are separated by spaces 91 through which slurry to be filtered may circulate. As slurry is drawn from the spaces 91 through the filter media into the chips and from them to pipe 16 and pump 88, the concentration of the particulate in the slurry remaining in the space 91 tends to increase adjacent the outer surface of the chips and such increases the likelihood of the particles in space 91 near the outer filter face 64 to agglomerate, thereby increasing the tendency of the particles on agglomeration to tend to fall out of the slurry. Particles which fall out of the slurry thus gravitate toward the drain outlet 86 of the tank. When the flow rate is below the critical level for a particular slurry, the particles in the slurry which are too large to pass through the filter media tend to agglomerate and more readily gravitate from the slurry and accumulate on the bottom of the tank leaving the filter media free of filter cake. Particles falling out of the slurry settle toward the drain outlet 86 where they accumulate in a concentrated form, which might be described as a sludge-like accumulation, indicated by volume 93, and remain substantially out of the circulation of slurry in the tank. As the accumulation of such fallen particles continues, the volume of such material 93 can be withdrawn through drain fitting 86 and drain line 94 under control of drain valve 90 while operation of the filter device continues without interruption and without adverse effect on operation of the filter device.

Where the linear dimension of filter chip 56 parallel to the axis of pipe 16, the length of the saddle in that direction, is 1⅞", the spacing between the chip filter surfaces 64 presented to the slurry may be of the order of 1" and the gaps 91 between the opposed filter faces of adjacent filter chips may be of the order of ⅛". Filter chip 56 as shown in FIGS. 8, 9 and 10 may include four filter units 45U or, as mentioned hereinbefore, may include such appropriate even number of filter units 45U as may be desired to be mounted upon a collector tube 34 between saddle 22 and plug 38. The width of such a filter chip 56 may be approximately 23" from edge E1 to edge E2 as shown in FIGS. 9 and 10. Thus, the horizontal area occupied by one such chip 56 with related interchip gap is of the order of 0.3 sq. ft. Where the filter units 45U have two filter faces, each providing 0.86 sq. ft. of filter area, a chip 56 having four filter units 45U would have 6.88 sq. ft. of filter area while a chip having eight filter units 45U would have 13.76 sq. ft. of filter area, but both would have the same horizontal area of 0.3 sq. ft.

In FIGS. 1 and 2, sixty-four filter chips 56 are shown mounted on pipe 16 of filter device 74. Assuming the saddles of those chips 56 are 1⅞" long in the direction of the axis of pipe 16, the sixty-four chips are mounted on 10 linear feet of pipe 16 and the chips occupy a horizontal area of approximately 19.2 sq. ft. If each chip has a filter area of 6.88 sq. ft., the combined filter area of the sixty-four chips is 440 sq. ft., while if the chips have respective filter areas of 13.76 sq. ft., the sixty-four chips would provide 880 sq. ft. of filter surface. Accordingly, the filter chips provide filter area on the order of 22–45 times the horizontal area they occupy. The tank 80 of course has a horizontal area somewhat larger than the horizontal area occupied by the chips so as to facilitate circulation of slurry in the tank around the chips.

The preferred embodiment of our invention illustrated in the drawings and described above is subject to modification without departing from the spirit and scope of the appended claims.

Having described our invention, what we claim as new and desire to secure by Letters Patent is:

1. A filter screen assembly for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, and means for impressing a reduced pressure on the interior of the collector tube to cause liquid and particles of the slurry as can pass through the slots of the plates to be drawn through the slots of the plates, the slotted surfaces of the plates being oriented so particulate material not drawn through the slots of the plates falls and does not collect on the outside of the slotted portions of the plates to form a filter cake.

2. A filter screen assembly as in claim 1 which includes a main pipe, a saddle member underlying the main pipe and adapted to cooperate with the collector tube remote from the closed end thereof, means for attaching the collector tube to the saddle member, means for attaching the saddle member to the main pipe, there being openings in the saddle member and in the main pipe in communication with the interior of the collector tube.

3. A filter screen assembly for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, a main pipe, a saddle member underlying the main pipe and having a surface upon which the main pipe seats, the saddle member adapted to cooperate with the collector tube remote from the closed end thereof, means for attaching the collector tube to the saddle member, means for attaching the saddle member to the main pipe seated on the saddle member, there being openings in the saddle member and in the main pipe in communication with the interior of the collector tube and means for impressing a reduced pressure on the interior of the collector tube to cause liquid and particles of the slurry as can pass through the slots of the plates to be drawn through the slots of the plates, the slotted surface of the plates being oriented so particulate material not drawn through the slots of the plates falls and does not collect on the outside of the slotted portions of the plates to form a filter cake.

4. A filter screen assembly as in claim 1 which includes a main pipe and means for connecting the main pipe to the collector tube with the main pipe in communication with the interior of the collector tube.

5. A filter screen assembly as in claim 2 in which the means for attaching the saddle member to the main pipe includes a U-bolt straddling the main pipe with its legs extending through respective portions of the saddle member and tightenable means cooperating with the respective legs of the U-bolt and the saddle member to hold the main pipe and the saddle member in assembled relation.

6. A filter chip for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, filter media mounted adjacent the exterior of the assembly of filter plates and collector tube to pre-filter all fluid flowing into the filter unit, the filter media being urged against the slotted plate faces of the filter unit by fluid flowing therethrough, and means for impressing a reduced pressure on the interior of the collector tube to cause liquid of the slurry to be drawn successively through the filter media and slots of the plates, the filter media and slotted surface of the plates being oriented so particulate material not drawn through the filter media does not collect on the outside of the filter media of the filter chip to form a filter cake.

7. A filter chip as in claim 6 which includes a main pipe, a saddle member underlying the main pipe and adapted to cooperate with the collector tube remote from the closed end thereof, means for attaching the collector tube to the saddle member, means for attaching the saddle member to the main pipe, there being openings in the saddle member and in the main pipe, the openings in the saddle member and in the main pipe being in communication with the interior of the collector tube.

8. A filter chip for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, filter media mounted adjacent the exterior of the assembly of filter plates and collector tube to pre-filter all fluid flowing into the filter unit, the filter media being urged against the slotted plate faces of the filter unit by fluid flowing therethrough, a main pipe, a saddle member underlying the main pipe and having a surface upon which the main pipe seats, the saddle member adapted to cooperate with the collector tube remote from the closed end thereof, means for attaching the collector tube to the saddle member, means for attaching the saddle member to the main pipe seated on the saddle member, there being openings in the saddle member and in the main pipe, the openings in the saddle member and in the main pipe being in communication with the interior of the collector tube and means for impressing a reduced pressure on the interior of the collector tube to cause liquid of the slurry to be drawn successively through the filter media and slots of the plates, the filter media and slotted surface of the plates being oriented so particulate material not drawn through the filter media does not collect on the outside of the filter media of the filter chip to form a filter cake.

9. A filter chip as in claim 6 in which the filter media pre-filters all fluid flowing through the filter chip to a main pipe and means for connecting the main pipe to the filter chip with the main pipe in communication with the interior of the collector tube.

10. A filter chip as in claim 7 in which the means for attaching the saddle member to the main pipe includes a U-bolt straddling the main pipe with its legs extending through respective portions of the saddle member and tightenable means cooperating with the respective legs of the U-bolt and the saddle member to hold the main pipe and the saddle member in assembled relation.

11. For a filter screen assembly, a filter unit in accordance with claim 6 in which the slots in the filter plate extend between respective separator bars and parallel to the edge of the plate having hook shaped members and are separated by dividers of prism shape section with a flat face in the plane of the slotted panel and projecting to an edge face in the cavity enclosed by the panels remote from the prism base, whereby the slots between the prism formed dividers widen from the face of the panel inwardly in the cavity surrounded by the panels.

12. A filter screen assembly for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, and means for impressing a reduced pressure on the interior of the collector tube to cause liquid and particles of the slurry as can pass through the slots of the plates to be drawn through the slots of the plates, the slotted surface of the plates being oriented so particulate material not drawn through the slots of the plates does not collect on the outside of the slotted portions of the plates to form a filter cake as particles in the unfiltered slurry are sorted gravitationally and concentrated as bottom sludge and floating sludge, means for withdrawing bottom sludge from the bottom of the unfiltered slurry and means for removing floating sludge from the surface of the unfiltered slurry.

13. A filter screen assembly as in claim 12 which includes a main pipe, a saddle member underlying the main pipe and adapted to cooperate with the collector tube remote from the closed end thereof, means for attaching the collector tube to the saddle member, means for attaching the saddle member to the main pipe, there being openings in the saddle member and in the main pipe in communication with the interior of the collector tube.

14. A filter screen assembly as in claim 12 which includes a main pipe and means for connecting the main pipe to the collector tube with the main pipe in communication with the interior of the collector tube.

15. A filter screen assembly as in claim 13 in which the means for attaching the saddle member to the main pipe includes a U-bolt straddling the main pipe with its legs extending through respective portions of the saddle member and tightenable means cooperating with the respective legs of the U-bolt and the saddle member to hold the main pipe and the saddle member in assembled relation.

16. A filter chip for removing particulate material from a slurry which comprises a pair of filter plates each having a plurality of slots therein, a hook member along an edge of each of the plates, a collector tube having slots therealong, each of the slots of the collector tube receiving the hook member of one of the plates so that the plates are mounted on the collector tube, means for closing one end of the collector tube, means for connecting other edges of the plates to form chambers therebetween, means forming a passageway communicating between each chamber and the interior of the collector tube, filter media mounted adjacent the exterior of the assembly of filter plates and collector tube to pre-filter all fluid flowing into the filter chip, the filter media being urged toward the slotted plate faces of the filter unit by fluid pressure differential therethrough, means for impressing a reduced pressure on the interior of the collector tube to cause liquid of the slurry to be drawn successively through the filter media and slots of the plates, the filter media and slotted surface of the plates being oriented so particulate material not drawn through the filter media does not collect on the outside of the filter media of the filter chip to form a filter cake as particles in the unfiltered slurry are gravitationally sorted and concentrated as bottom sludge and top floating sludge, means for withdrawing bottom sludge from the bottom of the unfiltered slurry and means for removing top floating sludge from the surface of the unfiltered slurry.

17. A filter chip as in claim 16 which includes a main pipe, a saddle member underlying the main pipe and adapted to cooperate with the collector tube remote from the closed end thereof, means for attaching the collector tube to the saddle member, means for attaching the saddle member to the main pipe, there being openings in the saddle member and in the main pipe, the openings in the saddle member and in the main pipe being in communication with the interior of the collector tube.

18. A filter chip as in claim 16 in which the filter media prefilters all fluid flowing through the filter chip to a main pipe and means for connecting the main pipe to the filter chip with the main pipe in communication with the interior of the collector tube.

19. A filter chip as in claim 17 in which the means for attaching the saddle member to the main pipe includes a U-bolt straddling the main pipe with its legs extending through respective portions of the saddle member and tightenable means cooperating with the respective legs of the U-bolt and the saddle member to hold the main pipe and the saddle member in assembled relation.

20. For a filter screen assembly, a filter unit in accordance with claim 16 in which the slots in the filter plate extend between respective separator bars and parallel to the edge of the plate having hook shaped members and are separated by dividers of prism shape section with a flat face in the plane of the slotted panel and projecting to an edge face in the cavity enclosed by the panels remote from the prism base, whereby the slots between the prism formed dividers widen from the face of the panel inwardly in the cavity surrounded by the panels.

* * * * *